3,160,680
Patented Dec. 8, 1964

3,160,680
POLY-α-OLEFIN RESIN COMPOSITION FOR COATING COPPER WIRE AND THE LIKE
Clarence E. Tholstrup and James C. Ownby, Kingsport, Tenn., assignors to Eastman Kodak Company, Rochester, N.Y., a corporation of New Jersey
No Drawing. Filed May 9, 1962, Ser. No. 193,595
18 Claims. (Cl. 260—897)

This invention broadly relates to a normally solid, thermoplastic resin composition comprising a normally solid, α-olefin polymer.

Normally solid, α-olefin polymers such as, for example normally solid polyethylene and normally solid polypropylene, are susceptible to an oxidative degradation which appears to be promoted by heat and by ultraviolet light. This degradation involves rupture of the polymer chains and formation of carbonyl (=C=O) groups. Evidence of such degradation in its early stages is the presence of peroxides. As this degradation progresses, articles manufactured from these polymers and coatings of these polymers tend to crack, become brittle and lose tensile strength to the extent of mechanical failure. It is common practice, therefore, to add to these polymers such stabilizers as antioxidants, ultraviolet light inhibitors and heat stabilizers. In the resulting poly-α-olefin resin compositions these additives generally function in ways which inhibit the degradation process and retard degradation of these polymers.

However, when these poly-α-olefin resin compositions are in contact with copper the degradation process tends to be substantially accelerated. Whether this is a result of copper promoting the degradation or a result of copper "poisoning" the additives, particularly the antioxidants, or a result of copper both promoting and poisoning, is undetermined. The fact is this effect does occur. Moreover, this effect of copper is substantial.

Normally solid, α-olefin polymers in general have a number of properties which are desired in wire coating materials and the like. Thus, for example, normally solid polypropylene exhibits excellent electrical properties along with exceptional covering capacity per pound of polymer. However, when copper wire and the like is involved, the copper effect does take place. The problem, therefore, to which this invention provides a solution, is how to minimize, if not eliminate, this copper effect on poly-α-olefin resin compositions.

This invention is based upon the discovery that N,N'-bis(carboxymethyl)dithiooxamide and N,N'-bis(carboxymethyl)oxamide, when added to normally solid, α-olefin polymers, minimize this copper effect.

In summary this invention broadly comprises a normally solid, poly-α-olefin resin composition containing at an effective concentration an N,N'-bis(carboxymethyl)-oxamide compound.

A normally solid, poly-α-olefin resin composition is a composition which consists essentially of at least one normally solid, poly-α-olefin polymer. This is a polymer derived from an α-monoolefinic hydrocarbon having 2–10 carbon atoms. The normally solid, homopolymers of α-monoolefinic hydrocarbons having 2–10 carbon atoms are such a polymer. The normally solid copolymers (which include graft polymers, addition polymers, block polymers and the like) of α-monoolefinic hydrocarbons having 2–10 carbon atoms as well as these α-monoolefinic hydrocarbons and other compounds are such a polymer. Examples of a normally solid polymer derived from an α-monoolefinic hydrocarbon having 2–10 carbon atoms are the linear and branched, low density and high density, crystalline and amorphous, normally solid, homopolymers and copolymers of ethylene, propylene, butene-1, isobutylene, pentene-1, 2-methylbutene-1, 3-methylbutene-1, hexene-1, heptene-1, octene-1, nonene-1, decene-1, 4-methylpentene-1, 4-methylhexene-1, 5-ethylhexene-1, 6-methylheptene-1, 6-ethylheptene-1, styrene, allyl benzene and the like. Processes for preparing a normally solid, poly-α-olefin polymer are well known and described in detail in the prior art. See, for example, the U.S. patent, No. 2,153,553, to Fawcett et al., the U.S. patent, No. 2,912,429, to Cash and the U.S. patent, No. 2,917,500 to Hagemayer et al. In general, a normally solid, poly-α-olefin polymer is a thermoplastic resin which at 20° C. is solid. It includes the so-called poly-α-olefin waxes which usually have average molecular weights in a range from about three thousand to about twelve thousand.

The normally solid, poly-α-olefin resin compositions, in addition to at least one, normally solid, poly-α-olefin polymer derived from an α-monoolefinic hydrocarbon having 2–10 carbon atoms, can also comprise other polymeric components. Thus, it can comprise a normally solid polymer derived from other α-monoolefinic hydrocarbons having 2–10 carbon atoms. It can comprise a different kind of polymer, generally present as a physical property improver. For many applications, such as wire coating, another polymer such as, for example, a rubber is usually blended with the poly-α-olefin polymer for improved low temperature brittleness properties. Examples of a suitable rubber include poly(isobutylene), poly(butadiene), poly(isoprene), butyl rubber, chlorobutyl rubber, acrylonitrile rubber, natural rubber, Neoprene and the like.

The normally solid, poly-α-olefin resin composition can also comprise, usually at conventional concentrations one or more antioxidants, ultraviolet light inhibitors, heat stabilizers, foaming agents, plasticizers, pigments, waxes, anticorrosion additives, fillers, extenders, slip agents, antiblocking agents and the like, including physical property improvers other than polymeric compounds. Conventional concentrations of antioxidants, ultraviolet light inhibitors and heat stabilizers are generally in a range from about 0.01 to about 5% by weight based on the poly-α-olefin resin content of the composition. However, higher and lower concentrations can be employed.

The N,N'-bis(carboxymethyl) oxamide compound is an oxalic acid derivative of the following general molecular formula:

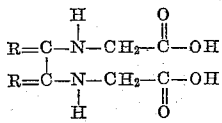

wherein each R is a radical independently selected from the group consisting of O and S radicals. Compounds conforming to this formula are N,N'-bis(carboxymethyl)-dithiooxamide, N,N' - bis(carboxymethyl)monothiooxamide, and N,N'-bis(carboxymethyl)oxamide. The compound N,N'-bis(carboxymethyl)dithiooxamide is commercially available from Mallinckrodt Chemical Works, St. Louis, Missouri. The compound N,N'-bis(carboxymethyl)monothiooxamide does not now appear to be either commercially available or readily prepared. However, there is no reason to believe that in fact it does not inhibit copper effect. N,N'-bis(carboxymethyl)oxamide does not now appear to be commercially available. However, it is readily prepared by admixing under alkaline conditions at about 5° C. glycine and diethyl oxalate at a mole ratio of glycine to diethyl oxalate of about 2:1.

The N,N'-bis(carboxymethyl)oxamide compound functions to inhibit copper effect and thereby stabilizes the normally solid, poly-α-olefin resin composition relative to the copper effect. This function is believed to come about as a result of the N,N'-bis(carboxymethyl)oxamide compound deactivating the molecules of copper which come into contact with the normally solid, poly-α-olefin resin composition.

Concentrations of the N,N'-bis(carboxymethyl)oxamide compound depend in general on the extent of inhibition of copper effect desired. This in turn depends on many variables, including the particular requirements involved in the intended end use of the poly-α-olefin composition of this invention. However, for most end uses a concentration of the N,N'-bis(carboxymethyl)oxamide compound in a range from about 0.01 to about 5% by weight of the poly-α-olefin resin content of the normally solid, poly-α-olefin resin composition gives satisfactory results.

The normally solid, poly-α-olefin resin composition of this invention is prepared by incorporating the N,N'-bis(carboxymethyl)oxamide compound into the normally solid, poly-α-olefin resin portion of the composition. Generally, such incorporation is performed by any one of a number of well-known methods, such as roll compounding, extrusion, solvent mixing and the like. For example, such incorporation can be performed by heating or otherwise softening the normally solid, poly-α-olefin resin portion to a workable consistency and then working in as by roll compounding the N,N'-bis(carboxymethyl)oxamide compound until a substantially uniform mixture or dispersion is obtained. Generally, such incorporation is done at the same time other additives are normally incorporated into the poly-α-olefin resin portion of the composition and usually along with such other additives.

A feature of advantage of the N,N'-bis(carboxymethyl)oxamide compound is that it generally is compatible with, and not substantially adversely affected by, the other components of the poly-α-olefin resin composition. Furthermore, the N,N'-bis(carboxymethyl)oxamide compound generally does not substantially adversely affect other components of the composition. For instance, the N,N'-bis(carboxymethyl)oxamide compound generally does not substantially adversely react with such foaming agents as azodicarbonamide and the like or with such antioxidants as butylated hydroxyanisole, butylated hydroxytoluene and other 2,6-dialkyl-4-methylphenols, esters of gallic acid, phenylamine derivatives, derivaties of phenothiazine, trihydroxyphenylketones, dialkyl esters of thiodicarboxylic acids, polyesters of thiodicarboxylic acids, alkylidene bisphenols, the condensation reaction products of p-alkylatedphenols with acetone, sulfonyl chloride and the like, and synergistic combinations of two or more of these and other antioxidants and other compounds.

The poly-α-olefin resin composition of this invention is especially useful as a wire coating material. It is applied to wire and the like by conventional ways and means. Recommended is the procedure and apparatus described in Tenite Technical Report No. 7 (Rev.), "Coating Wire With Tenite Polypropylene" published in December 1961, by Eastman Chemical Products, Inc.

While the poly-α-olefin resin composition of this invention is particularly useful for coating wire and the like, it can also be cast or molded into various shaped articles, such as, for example, pellets, sheeting, films, filaments, fibers, bars, tubes, specially shaped structural elements and the like as by conventional casting and molding techniques which include extrusion, blow-molding and the like.

This invention is further illustrated by the following examples of various aspects thereof, including specific embodiments. Unless otherwise indicated, this invention is not limited to these specific embodiments.

EXAMPLE 1

This example illustrates a specific embodiment of a copper effect stabilized, normally solid, polypropylene resin composition of this invention.

The formulation of the specific composition is:

| Components: | Parts by weight |
| --- | --- |
| Resin portion— | |
| Normally solid polypropylene | 1000 |
| Additives— | |
| 4,4'-butylidenebis(6-tert.butyl-m-cresol) | 1 |
| Dilauryl 3,3'-thiodipropionate | 1 |
| N,N'-bis(carboxymethyl)-diothiooxamide | 10 |

The specific composition is prepared as follows:

The normally solid resin is banded on hot milling rolls with the temperature of the front roll at 350° F. and the temperature of the back roll at 300° F. When the resin has reached a workable consistency, the additives are added thereto as rapidly as possible so as to keep the total milling time of the resin to about six minutes. At the end of this time and upon completion of the addition and the dispersion of the additives, the resulting poly-α-olefin resin composition is stripped from the rolls and then granulated.

The polypropylene resin product thus obtained is useful as a coating for copper wire and the like destined for applications where low temperature brittleness of the coating is not a factor. It is applied to copper wire and the like by conventional, extrusion, wire coating procedure.

EXAMPLE 2

This example illustrates a specific embodiment of another copper effect stabilized, normally solid, polypropylene resin composition of this invention.

The formulation of the specific composition is:

| Components: | Parts by weight |
| --- | --- |
| Resin portion— | |
| Blend of normally solid polypropylene and normally solid polyisobutylene, the weight ratio of polypropylene to polyisobutylene being 9:1 | 1000 |
| Additives— | |
| 4,4'-butylidenebis(6-tert.butyl-m-cresol) | 1 |
| Dilauryl 3,3'-thiodipropionate | 3 |
| N,N'-dis(carboxymethyl)-dithiooxamide | 5 |

The specific composition is prepared according to the procedure of Example 1.

The resulting polypropylene resin composition is useful as a coating for copper wire and the like. The composition has better low temperature brittleness properties than the embodiment of Example 1. The composition is applied to copper wire and the like by conventional, extrusion, wire coating procedure.

EXAMPLE 3

This example illustrates another specific embodiment of a copper effect stabilized, normally solid, polypropylene resin composition of this invention.

The formulation of the specific composition is as follows:

| Components: | Parts by weight |
| --- | --- |
| Resin portion— | |
| Blend of normally solid, propylene and normally solid polyisobutylene, the weight ratio of polypropylene to polyisobutylene being 9:1 | 1000 |
| Additives— | |
| 4,4'-butylidenesbis(6-tert.butyl-m-cresol) | 3 |
| Dilauryl 3,3'-thiodipropionate | 5 |
| N,N'-bis(carboxymethyl)-dithiooxamide | 5 |

The composition is prepared according to the procedure of Example 1.

The resulting polypropylene resin composition is useful for coating copper wire and the like. It is applied to copper wire and the like by conventional, extrusion, wire coating procedure.

EXAMPLE 4

This example illustrates another specific embodiment of a coper effect stabilized, normally solid, polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 4,4'-butylidenebis(6-tert.butyl-m-cresol) | 3 |
| Dilauryl 3,3'-thiodipropionate | 5 |
| N,N'-bis(carboxymethyl)oxamide | 5 |

This composition is prepared according to the procedure of Example 1.

The resulting polypropylene resin product is useful for coating copper wire and the like. It is applied to copper wire and the like by conventional, extrusion, wire coating procedure.

EXAMPLE 5

This example illustrates still another specific embodiment of a copper effect stabilized, normally solid, polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 4,4'-butylidenebis(6-tert.butyl-m-cresol) | 3 |
| Dilauryl 3,3'-thiodipropionate | 5 |
| Calcium stearate | 1 |
| N,N'-bis(carboxymethyl)dithiooxamide | 5 |

This composition is prepared according to the procedure of Example 1.

The resulting product is useful for coating copper wire and the like. It is applied to copper wire and the like by conventional, extrusion, wire coating procedure.

EXAMPLE 6

This example illustrates another specific embodiment of a copper effect stabilized, normally solid, polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 4,4'-thiobis(6-tert.butyl-m-cresol) | 3 |
| Dilaury 3,3'-thiodipropionate | 5 |
| N,N'-bis(carboxymethyl)dithiooxamide | 5 |

The composition is prepared according to the procedure of Example 1.

The resulting polypropylene resin composition is useful for coating copper wire and the like. It is applied to copper wire and the like by conventional, extrusion, wire coating procedure.

EXAMPLE 7

This example illustrates another specific embodiment of a copper effect stabilized, normally solid polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 2,6-bis(1-methylheptadecyl)-p-cresol | 3 |
| Dilauryl 3,3'-thiodipropionate | 5 |
| N,N'-bis(carboxymethyl)dithiooxamide | 5 |

This composition is prepared according to the procedure of Example 1.

The resulting polypropylene resin product is useful for coating copper wire and the like. It is applied to copper wire and the like by conventional, extrusion, wire coating procedure.

EXAMPLE 8

This example illustrates another specific embodiment of a copper effect stabilized, normally solid, polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 4,4'-butylidenebis(6-tert.butyl-m-cresol) | 3 |
| Polyester of 3,3'-thiodipropionic acid, ethylene glycol and 2-ethylhexanol, the average molecular weight of the polyester being 600 | 5 |
| N,N'-bis(carboxymethyl)-dithiooxamide | 5 |

The composition of this formulation is prepared according to the procedure of Example 1.

The product which results is useful for coating copper wire and the like. It is applied to copper wire and the like by conventional, extrusion, wire coating procedure.

EXAMPLE 9

This example illustrates another specific embodiment of a copper effect stabilized, normally solid polypropylene composition of this invention.

The formulation of the specific composition is as follows.

| Components: | Parts by weight |
|---|---|
| Resin portion— | |
| Blend of normally solid polypropylene and normally solid polyisobutylene, the weight ratio of polypropylene to polyisobutylene being 9:1 | 1000 |
| Additives— | |
| 4,4'-butylidenebis(6-tert.butyl-m-cresol) | 3 |
| Polyester of 3,3'-thiodipropionic acid, ethylene glycol and 2-ethylhexanol, the average molecular weight of the polyester being 600 | 5 |
| N,N'-bis(carboxymethyl)oxamide | 5 |

This composition is prepared according to the procedure of Example 1.

The resulting polypropylene resin composition is useful for coating copper wire and the like. It is applied to copper wire and the like by conventional, extrusion, wire coating procedure.

EXAMPLE 10

This example illustrates a specific embodiment of another copper effect stabilized, normally solid, poly-α-olefin resin composition of this invention.

The formulation of the specific composition is as follows.

| Components: | Parts by weight |
|---|---|
| Resin portion— | |
| Blend of (a) normally solid, copolymer of propylene and butene-1, the weight ratio of propylene to butene-1 being 9:1, and (b) normally solid, polyisobutylene, the weight ratio of the copolymer to the polyisobutylene being 9:1 | 1000 |
| Additives— | |
| 4,4'-butylidenebis(6-tert.butyl-m-cresol) | 3 |
| Dilauryl 3,3'-thiodipropionate | 5 |
| N,N'-bis(carboxymethyl)-dithiooxamide | 5 |

This composition is prepared according to the procedure of Example 1.

The resulting poly-α-olefin product is useful for coating copper wire and the like. It is applied to copper wire and the like by conventional, extrusion, wire coating procedure.

EXAMPLE 11

This example illustrates a specific embodiment of another poly-α-olefin resin composition of this invention.

The formulation of the specific composition is as follows.

| Components: | Parts by weight |
|---|---|
| Resin portion— | |
| A propylene-isoprene polymer, the weight ratio of propylene to isoprene being 1000:7 | 1000 |
| Additives— | |
| 4,4'-butylidenebis(6-tert.butyl-m-cresol) | 3 |
| Dilauryl 3,3'-thiodipropionate | 5 |
| N,N'-bis(carboxymethyl)-dithiooxamide | 5 |

The propylene-isoprene polymer is a normally solid, crystalline polymer prepared as by first polymerizing propylene to form a crystalline, propylene polymer and then copolymerizing said propylene polymer with isoprene until the resulting product has an isoprene content of about 0.7% by weight.

The specific composition of this formulation is prepared according to the procedure of Example 1.

The resulting product is useful for coating copper wire and the like. It is applied to wire and the like by conventional, extrusion, wire coating procedure.

The stabilities of these specific, poly-α-olefin resin compositions of this invention, and thus the stabilities of the general poly-α-olefin resin composition of this invention, relative to copper effect, are demonstrated by the following tabulated data obtained in accordance with the following described procedure.

Test samples were made following generally the roll compounding and granulation procedure described in Example 1. The additives incorporated into various samples and left out of various samples are indicated in the following tables. In a number of the samples, as indicated in the tables, copper was added. This was done in each case by milling into the sample two minutes before it was stripped from the rolls copper dust (Fisher catalog number C-431, Fisher Scientific Company). The test samples thus made were in granulated form.

For the 140° and 160° C. oven stability tests hereinafter described, a portion of each test sample to be subjected to these tests was compression molded into a sheet having the dimension 8 inch x 8 inch x 1/16 inch. For the 140° C. stress crack-free tests hereinafter described, a portion of each test sample to be subjected to these tests was injection molded into ASTM tensile bars 2½ inch x ½ inch x 1/16 inch having a straight central section 1 inch x ¼ inch x 1/16 inch with a 1/8 inch radius at the shoulders.

The stability tests are as follows.

140° C. Oven Life Test

In this test, five 0.25 gram specimens (½ inch x ½ inch x 1/16 inch) are cut from a compression molded plate and placed on separate 25 millimeter watch glasses. These specimens are stored in a forced-air oven at a temperature of 140° C. Periodically, one of the specimens is removed and analyzed as follows for peroxides content. The specimen is cut into 6–10 pieces and transferred to a 250 milliliter flask containing 20 milliliters of carbon tetrachloride. The pieces are digested in the carbon tetrachloride for 25 minutes while treating the same on a steam bath. This aids the extraction of peroxides from the pieces since the resin content of the pieces is not soluble in carbon tetrachloride. To the resulting solution are then added 20 milliliters of a mixture of glacial acetic acid and chloroform at a volumetric ratio of glacial acetic acid to chloroform of 3:2, and 1 milliliter of saturated aqueous potassium iodide. The flask is sealed and stirred for 2 minutes. The resulting reaction mixture is then quenched with 100 milliliters of distilled water. 1 milliliter of starch is added as a color indicator for iodine liberated by the peroxide. The presence of peroxide is indicated by the mixture having a blue color.

As soon as a blue color is detected upon analysis of one of the specimens, the time is noted. The time interval in hours during which the specimens of the test sample were in the oven is determined. This time interval is the 140° C. oven life of the sample.

160° C. Oven Life Test

The procedure of this test is the same as that of the 140° C. oven life test except that the specimens are stored in a forced-air oven at 160° C.

140° C. Stress Crack-Free Test

In this test 4 tensile bar specimens of the test sample are bent into a U-shape and while so bent are mounted in a stainless steel channel 5/8 inch wide by ½ inch deep. The tensile bars and channel are placed into a forced-air oven and stored therein at a temperature of 140° C. The tensile bars are periodically examined for the appearance of cracks, visible to the unaided eye, in at least two of the tensile bar specimens. When cracks appear in at least two of the specimens, the time is noted and the residence time in the oven of the tensile bar specimens determined. This time in hours is the 140° C. stress crack-free life of the test sample.

In the test samples employed in these stability tests the normally solid polypropylene resin that was used was a conventional polypropylene having an I.V. at 145° C. of 1.88 and a melt flow of 5.84 at 230° C. at 2.16 kg., the normally solid polyisobutylene resin that was used was a conventional polyisobutylene product marketed as Vistanex L-80, having a viscosity average molecular weight (Staudinger) of 64,000–81,000 and an I.V. (dl/g.) of 2.04–2.57, while the 90:10 blend of these two resins had an I.V. at 145° C. of 1.73 and a melt flow of 2.9 at 230° C. at 2.16 kg. The copolymer of propylene and butene-1, that was employed, was characterized by a density of 0.89, an I.V. at 145° C. of 2.62 and a melt flow of 3.31 at 230° C. at 2.16 kg. The propylene-isoprene polymer that was used had a density of 0.911, an I.V. at 145° C. of 1.80 and a melt flow of 2.15 at 230° C. at 2.16 kg.

The stability test data and test sample data are tabulated as follows.

TABLE I

| Test Samples | 1 | 2 | 3 | 4 | 5 | 6 | 7 |
|---|---|---|---|---|---|---|---|
| Components of test samples in parts by weight: | | | | | | | |
| Resin portion of Example 1 | 1,000 | 1,000 | 1,000 | 1,000 | 1,000 | 1,000 | 1,000 |
| 4,4'-butylidenebis(6-tert.butyl-m-cresol) | 1 | 1 | 1 | 1 | 1 | 1 | 1 |
| Dilauryl 3,3'-thiodipropionate | 1 | 1 | 1 | 1 | 1 | 1 | 1 |
| N,N'-bis(carboxymethyl)dithiooxamide | | | 10 | | | | |
| Dithiooxamide | | | | 10 | | | |
| Bis(salicylidene)dithiooxamide | | | | | 10 | | |
| N,N'-bis(benzyl)dithiooxamide | | | | | | 10 | |
| Oxanilide | | | | | | | 10 |
| Copper | | 1 | 1 | 1 | 1 | 1 | 1 |
| 160° C. Oven Life Test (hours) | >150 | 20 | 150 | 30 | 25 | 35 | 15 |

Test sample 3, except for its copper content, corresponds to the specific composition of Example 1.

TABLE II

| Test Samples | 1 | 2 | 3 | 4 |
|---|---|---|---|---|
| Components of test samples in parts by weight: | | | | |
| Resin portion of Example 2 | 1,000 | 1,000 | 1,000 | 1,000 |
| 4,4'-butylidene-bis(6-tert.butyl-m-cresol) | 1 | 1 | 1 | 1 |
| Dilauryl 3,3'-thiodipropionate | 3 | 3 | 3 | 3 |
| N,N'-bis(carboxymethyl)dithiooxamide | | | 5 | |
| Dithiooxamide | | | | 5 |
| Copper | | 15 | 15 | 14 |
| 160° C. Oven Life Test (hours) | 400 | 65 | 285 | 100 |
| 140° C. Oven Life Test (hours) | >2,000 | 530 | >1,900 | 520 |
| 140° C. Stress Crack-free Test (hours) | 1,400 | 330 | 1,300 | |

Test sample 3, except for its copper content, corresponds to the specific composition of Example 2.

TABLE III

| Test Samples | 1 | 2 | 3 | 4 | 5 | 6 | 7 |
|---|---|---|---|---|---|---|---|
| Components of test samples in parts by weight: | | | | | | | |
| Resin portion of Example 3 | 1,000 | 1,000 | 1,000 | 1,000 | 1,000 | 1,000 | 1,000 |
| 4,4'-butylidene-bis(6-tert.butyl-m-cresol) | 3 | 3 | 3 | 3 | 3 | 3 | 3 |
| Dilauryl 3,3'-thiodipropionate | 5 | 5 | 5 | 5 | 5 | 5 | 5 |
| Calcium stearate | | | | 1 | | | |
| N,N'-bis(carboxymethyl)-dithiooxamide | | | 5 | 5 | | | |
| N,N'-bis(carboxymethyl)-oxamide | | | | | 5 | | |
| N,N'-bis(benzyl)-dithiooxamide | | | | | | 5 | |
| Oxanilide | | | | | | | 5 |
| Copper | | 15 | 15 | 15 | 15 | 15 | 15 |
| 160° C. Oven Life Test (hours) | >400 | 20 | 100 | 125 | 50 | 22 | 25 |

Except for their copper contents, test samples 3, 4 and 5 in this series correspond to the specific compositions of Examples 3, 5 and 4, respectively.

TABLE IV

| Test Samples | 1 | 2 | 3 |
|---|---|---|---|
| Components of test samples in parts by weight: | | | |
| Resin portion of Example 6 | 1,000 | 1,000 | 1,000 |
| 4,4'-thiobis-(6-tert.butyl-m-cresol) | 3 | 3 | 3 |
| Dilauryl 3,3'-thiodipropionate | 5 | 5 | 5 |
| N,N'-bis(carboxymethyl)dithiooxamide | | | 5 |
| Copper | | 15 | 15 |
| 160° C. Oven Life Test (hours) | >400 | 25 | 105 |

Test sample 3, except for its copper content, corresponds to the specific composition of Example 6.

TABLE V

| Test Samples | 1 | 2 | 3 |
|---|---|---|---|
| Components of test samples in parts by weight: | | | |
| Resin portion of Example 7 | 1,000 | 1,000 | 1,000 |
| 2,6-bis(1-methylheptadecyl)-p-cresol | 3 | 3 | 3 |
| Dilauryl 3,3'-thiodipropionate | 5 | 5 | 5 |
| N,N'-bis(carboxymethyl)dithiooxamide | | | 5 |
| Copper | | 15 | 15 |
| 160° C. Oven Life Test (hours) | >400 | 25 | 70 |

Test sample 3 in this series, except for its copper content, corresponds to the specific composition of Example 7.

TABLE VI

| Test Samples | 1 | 2 | 3 | 4 |
|---|---|---|---|---|
| Components of test samples in parts by weight: | | | | |
| Resin portion of Example 8 | 1,000 | 1,000 | 1,000 | 1,000 |
| 4,4'-butylidenebis(6-tert. butyl-m-cresol) | 3 | 3 | 3 | 3 |
| Polyester of 3,3'-thiodipropionic acid, ethylene glycol and 2-ethyl-hexanol, the average molecular weight of the polyester being 600 | 5 | 5 | 5 | 5 |
| N,N'-bis(carboxy-methyl)dithio-oxamide | | | 5 | |
| N,N'-bis(carboxy-methyl)oxamide | | | | 5 |
| Copper | | 15 | 15 | 15 |
| 160° C. Oven Life Test (hours) | >400 | 15 | 60 | 40 |

In this test series, samples 3 and 4, except for their copper contents, correspond to the specific compositions of Examples 8 and 9.

TABLE VII

| Test Samples | 1 | 2 | 3 |
|---|---|---|---|
| Components of test samples in parts by weight: | | | |
| Resin portion of Example 10 | 1,000 | 1,000 | 1,000 |
| 4,4'-butylidenebis(6-tert.butyl-m-cresol) | 3 | 3 | 3 |
| Dilauryl 3,3'-thiodipropionate | 5 | 5 | 5 |
| N,N'-bis(carboxymethyl)-dithiooxamide | | | 5 |
| Copper | | 15 | 15 |
| 160° C. Oven Life Test (hours) | >300 | 12 | 65 |

Test sample 3 of this series, except for its copper content, corresponds to the specific composition of Example 10.

TABLE VIII

| Test Samples | 1 | 2 | 3 |
|---|---|---|---|
| Components of test samples in parts by weight: | | | |
| Resin portion of Example 11 | 1,000 | 1,000 | 1,000 |
| 4,4'-butylidenebis(6-tert.butyl-m-cresol) | 3 | 3 | 3 |
| Dilauryl 3,3'-thiodipropionate | 5 | 5 | 5 |
| N,N-bis(carboxymethyl)dithiooxamide | | | 5 |
| Copper | | 15 | 15 |
| 160° C. Oven Life Test (hours) | >300 | 18 | 70 |

Test sample 3 of this series, except for its copper content, corresponds to the specific compositions of Example 11.

These data strikingly demonstrate the high stability, relative to copper effect, of poly-α-olefin resin compositions containing an N,N'-bis(carboxymethyl)oxamide compound at an effective concentration. Moreover, these data demonstrate the superior stability achieved in poly-α-olefin resin compositions containing a N,N'-bis(carboxymethyl)oxamide compound as compared to poly-α-olefin resin compositions containing similar compounds.

Thus, there are provided poly-α-olefin resin compositions which have a high degree of protection relative to the copper effect.

Other features, advantages and embodiments of this invention will be apparent to those in the exercise of ordinary skill in the art after reading the foregoing disclosure. In this regard, while this invention has been described in considerable detail relative to specific embodiments thereof, variations and modifications of these embodiments can be effected within the spirit and scope of the invention as disclosed and claimed.

The embodiments of the invention in which an exclusive property or privilege is claimed are defined as follows:

1. A normally solid, poly-α-olefin resin composition containing an N,N'-bis(carboxymethyl)oxamide represented by the formula

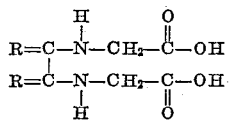

tent, corresponds to the specific composition of Example the group consisting of O and S radicals, said oxamide being at a concentration sufficient to substantially inhibit copper effect.

2. A normally solid, poly-α-olefin resin composition containing an N,N'-bis(carboxymethyl)oxamide represented by the formula

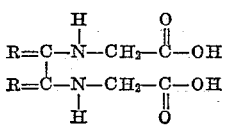

wherein each R is a radical independently selected from the group consisting of O and S radicals, said oxamide being at a concentration in a range from about 0.01 to about 5% by weight of the poly-α-olefin resin content of the composition.

3. A normally solid, poly-α-olefin resin composition containing N,N'-bis(carboxymethyl)dithiooxamide at a concentration in a range from about 0.01 to about 5% by weight of poly-α-olefin resin content of the composition.

4. A normally solid, poly-α-olefin resin composition containing N,N'-bis(carboxymethyl)oxamide at a concentration in a range from about 0.01 to about 5% by weight of the poly-α-olefin resin content of the composition.

5. A normally solid, poly-α-olefin resin composition consisting essentially of at least one normally solid, poly-α-olefin resin; an antioxidant at a concentration sufficient to substantially inhibit oxidative attack of said resin in the absence of copper; and an N,N'-bis(carboxymethyl)oxamide represented by the formula

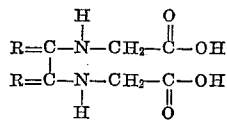

wherein each R is a radical independently selected from the group consisting of O and S radicals, said oxamide being at a concentration sufficient to substantially inhibit copper effect.

6. A normally solid, polypropylene resin composition consisting essentially of a normally solid polypropylene resin; at least one antioxidant at a concentration sufficient to substantially inhibit oxidative attack of said resin in the absence of copper; and an N,N'-bis(carboxymethyl)oxamide represented by the formula

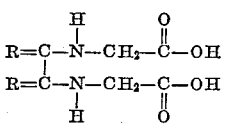

wherein each R is a radical independently selected from the group consisting of O and S radicals, said oxamide being at a concentration sufficient to substantially inhibit copper effect.

7. A normally solid, thermoplastic, wire-coating composition consisting essentially of a normally solid, thermoplastic, blend of a normally solid, polypropylene resin and a normally solid polyisobutylene; at least one antioxidant at a concentration sufficient to substantially inhibit oxidative attack of said polypropylene resin in the absence of copper; and an N,N'-bis(carboxymethyl)oxamide represented by the formula

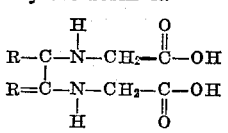

wherein each R is a radical independently selected from the group consisting of O and S radicals, said oxamide being at a concentration sufficient to substantially inhibit copper effect.

8. A normally solid, thermoplastic, wire-coating composition consisting essentially of a normally solid, thermoplastic, blend of a normally solid, polypropylene resin and a normally solid polyisobutylene; 4,4'-butylidenebis-(6-tert.butyl-m-cresol) at a concentration in a range from about 0.01 to about 5% by weight of said resin; and an N,N'-bis(carboxymethyl)oxamide represented by the formula

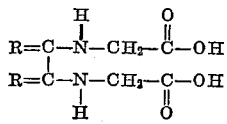

wherein each R is a radical independently selected from the group consisting of O and S radicals, said oxamide being at a concentration in a range from about 0.01 to about 5% by weight of said resin.

9. A normally solid, thermoplastic, wire-coating composition consisting essentially of a normally solid, thermoplastic, blend of a normally solid, polypropylene resin and a normally solid polyisobutylene; 4,4'-butylidenebis-(6-tert.butyl-m-cresol) and dilauryl 3,3'-thiodipropionate at concentrations in a range from about 0.01 to about 5% by weight of said resin; and an N,N'-bis(carboxymethyl)oxamide represented by the formula

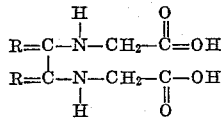

wherein each R is a radical independently selected from the group consisting of O and S radicals, said oxamide being at a concentration in a range from about 0.01 to about 5% by weight of said resin.

10. A normally solid, thermoplastic, wire-coating composition consisting essentially of a normally solid, thermoplastic, blend of a normally solid, polypropylene resin and a normally solid polyisobutylene; dilauryl 3,3'-thiodipropionate at a concentration in a range from about 0.01 to about 5% by weight of said resin; and an N,N'-bis(carboxymethyl)oxamide represented by the formula

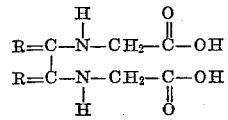

wherein each R is a radical independently selected from the group consisting of O and S radicals, said oxamide being at a concentration in a range from about 0.01 to about 5% by weight of said resin.

11. A normally solid, thermoplastic, wire-coating composition consisting essentially of a normally solid, thermoplastic, blend of a normally solid, polypropylene resin and a normally solid polyisobutylene; 4,4'-thiobis(6-tert.butyl-m-cresol) at a concentration in a range from about 0.01 to about 5% by weight of said resin; and an N,N'-bis(carboxymethyl)oxamide represented by the formula

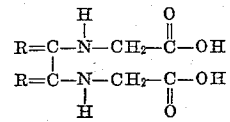

wherein each R is a radical independently selected from the group consisting of O and S radicals, said oxamide being at a concentration in a range from about 0.01 to about 5% by weight of said resin.

12. A normally solid, thermoplastic, wire-coating composition consisting essentially of a normally solid, thermoplastic, blend of a normally solid, polypropylene resin and a normally solid polyisobutylene; 4,4'-thiobis(6-tert.butyl-m-cresol) and dilauryl 3,3-thiodipropionate at concentrations in a range from about 0.01 to about 5% by weight of said resin; and an N,N'-bis-(carboxymethyl)-oxamide represented by the formula

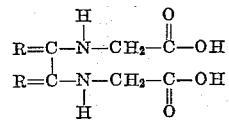

wherein each R is a radical independently selected from the group consisting of O and S radicals, said oxamide being at a concentration in a range from about 0.01 to about 5% by weight of said resin.

13. A normally solid, thermoplastic, wire-coating composition consisting essentially of a normally solid, thermoplastic, blend of a normally solid polyisobutylene; 2,6-bis-(1-methylheptadecyl)-p-cresol and dilauryl 3,3'-thiodipropionate at concentrations in a range from about 0.01 to about 5% by weight of said resin; and an N,N'-bis-(carboxymethyl)oxamide represented by the formula

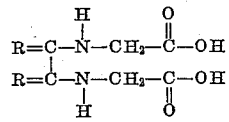

wherein each R is a radical independently selected from the group consisting of O and S radicals, said oxamide being at a concentration in a range from about 0.01 to about 5% by weight of said resin.

14. A normally solid, thermoplastic, wire-coating composition consisting essentially of a normally solid, thermoplastic, blend of a normally solid, polypropylene resin and a normally solid polyisobutylene; 4,4'-butylidenebis-(6-tert.butyl-m-cresol) and a polyester of 3,3'-thiodipropionic acid, ethylene glycol and 2-ethylhexanol, the average molecular weight of said polyester being about 600, at concentrations in a range from about 0.01 to about 5% by weight of said resin; and an N,N'-bis-(carboxymethyl)oxamide represented by the formula

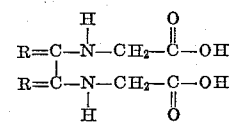

wherein each R is a radical independently selected from the group consisting of O and S radicals, said oxamide being at a concentration in a range from about 0.01 to about 5% by weight of said resin.

15. A process for making a normally solid, poly-α-olefin resin composition characterized by substantial stability relative to oxidative attack even in the presence of copper, which comprises: incorporating into a normally solid, poly-α-olefin resin at least one antioxidant and an N,N'-bis(carboxymethyl)oxamide represented by the formula

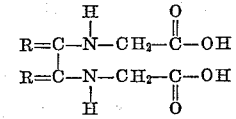

wherein each R is a radical independently selected from the group consisting of O and S radicals, the quantity of said antioxidant being sufficient to substantially inhibit oxidative attack of said resin in the absence of copper and the quantity of said N,N'-bis(carboxymethyl)oxamide being sufficient to substantially inhibit copper effect.

16. A normally solid, thermoplastic wire coating composition consisting essentially of a normally solid, thermoplastic blend of a normally solid, polypropylene resin and a normally solid, polyisobutylene, a hindered phenol antioxidant and an ester of 3,3'-thiodipropionic acid at concentrations sufficient to substantially inhibit oxidative attack of said polypropylene resin in the absence of copper; and an N,N'-bis(carboxymethyl)oxamide represented by the formula

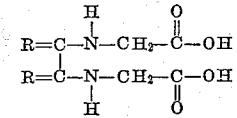

wherein each R is a radical independently selected from the group consisting of O and S radicals, said oxamide being at a concentration sufficient to substantially inhibit copper effect.

17. Electrical wire coated with a normally solid, poly-α-olefin resin composition containing an N,N'-bis(carboxymethyl)oxamide represented by the formula

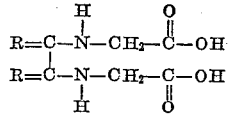

wherein each R is a radical independently selected from the group consisting of O and S radicals, said oxamide being at a concentration sufficient to substantially inhibit copper effect.

18. Shaped articles of a normally solid, poly-α-olefin resin composition containing an N,N'-bis(carboxymethyl)oxamide represented by the formula

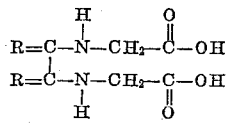

wherein each R is a radical independently selected from the group consisting of O and S radicals, said oxamide being at a concentration sufficient to substantially inhibit copper effect.

References Cited in the file of this patent
UNITED STATES PATENTS

| | | |
|---|---|---|
| 2,317,811 | Scheiber | Apr. 27, 1943 |
| 2,462,123 | Nelson | Feb. 22, 1949 |
| 2,956,982 | McCall et al. | Oct. 18, 1960 |

UNITED STATES PATENT OFFICE
CERTIFICATE OF CORRECTION

Patent No. 3,160,680                               December 8, 1964

Clarence E. Tholstrup et al.

It is hereby certified that error appears in the above numbered patent requiring correction and that the said Letters Patent should read as corrected below.

Column 11, line 64, for "tent, corresponds to the specific compositon of Example" read -- wherein each R is a radical independently selected from --.

Signed and sealed this 6th day of July 1965.

(SEAL)
Attest:

ERNEST W. SWIDER                                    EDWARD J. BRENNER
Attesting Officer                                         Commissioner of Patents